(12) United States Patent
Lisch et al.

(10) Patent No.: US 11,597,134 B2
(45) Date of Patent: Mar. 7, 2023

(54) SEAL PIN FLOW RATE METHOD AND SYSTEM

(71) Applicant: AMCOR RIGID PLASTICS USA, LLC, Saline, MI (US)

(72) Inventors: G. David Lisch, Jackson, MI (US); Richard J. Steih, Jackson, MI (US)

(73) Assignee: LiquiForm Group LLC, Saline, MI (US)

( * ) Notice: Subject to any disclaimer, the term of this patent is extended or adjusted under 35 U.S.C. 154(b) by 416 days.

(21) Appl. No.: 16/614,865

(22) PCT Filed: Jul. 10, 2017

(86) PCT No.: PCT/US2017/041384
§ 371 (c)(1),
(2) Date: Nov. 19, 2019

(87) PCT Pub. No.: WO2019/013754
PCT Pub. Date: Jan. 17, 2019

(65) Prior Publication Data
US 2020/0171737 A1    Jun. 4, 2020

(51) Int. Cl.
*B29C 49/78* (2006.01)
*B29C 49/12* (2006.01)
(Continued)

(52) U.S. Cl.
CPC ............ *B29C 49/783* (2013.01); *B29C 49/12* (2013.01); *B29C 49/46* (2013.01); *B29C 49/78* (2013.01);
(Continued)

(58) Field of Classification Search
CPC .......... B29C 2049/7834; B29C 49/783; B29C 49/42
See application file for complete search history.

(56) References Cited

U.S. PATENT DOCUMENTS

| | | |
|---|---|---|
| 7,703,484 B2 | 4/2010 | Montavoci et al. |
| 2011/0135778 A1 | 6/2011 | Andison et al. |

(Continued)

FOREIGN PATENT DOCUMENTS

| | | |
|---|---|---|
| EP | 2669069 A1 | 12/2013 |
| WO | WO-2013063453 A1 | 5/2013 |

(Continued)

OTHER PUBLICATIONS

Supplementary European Search Report dated Jan. 15, 2021 issued in corresponding European Application No. 17917762.1 (8 pages).

(Continued)

*Primary Examiner* — Timothy Kennedy
*Assistant Examiner* — Alexander A Wang
(74) *Attorney, Agent, or Firm* — Eric J. Sosenko; Jonathan P. O'Brien; Honigman LLP

(57) ABSTRACT

A method for forming and filling a container. The method includes: determining an effective fill area of an opening of the container through which fluid can pass while a stretch rod is seated within the opening; actuating a seal pin to open a nozzle passage of the nozzle to allow the fluid to flow through the nozzle passage and through the opening to simultaneously form and fill the container; detecting a degree to which the nozzle passage is open; increasing fill velocity of the fluid to the nozzle as the nozzle passage is opened; setting fill velocity of the fluid to a maximum fill velocity when the nozzle passage is opened such that an area of the nozzle passage is at least equal to the effective fill area at the opening of the finish; and closing the seal pin after the container is formed and filled.

11 Claims, 6 Drawing Sheets

(51) Int. Cl.
  *B29C 49/46*  (2006.01)
  *B29K 67/00*  (2006.01)
  *B29L 31/00*  (2006.01)

(52) U.S. Cl.
  CPC ............... *B29C 2049/4664* (2013.01); *B29K 2067/003* (2013.01); *B29L 2031/712* (2013.01)

(56) References Cited

U.S. PATENT DOCUMENTS

| | | |
|---|---|---|
| 2013/0313761 A1 | 11/2013 | Haesendonckx et al. |
| 2016/0144550 A1 | 5/2016 | Kumar et al. |
| 2018/0290366 A1 | 10/2018 | Okuyama et al. |

FOREIGN PATENT DOCUMENTS

| | | |
|---|---|---|
| WO | WO-2014209356 A1 | 12/2014 |
| WO | WO-2017090339 A1 | 6/2017 |

OTHER PUBLICATIONS

International Search Report and Written Opinion issued in PCT/US2017/041384, dated Feb. 9, 2018; ISA/KR.

| Seal Pin Full Flow Position ||||| 
|---|---|---|---|---|
| Stretch Rod Diameter | Preform Finish Size | Preform Finish I.D. | Seal Pin Diameter | Seal Pin Position for Full Flow |
| 14mm | 40mm | 32.76mm | 37mm | 11.5mm |
| 8mm | 40mm | 32.76mm | 34mm | 13.8mm |
| 14mm | 38mm | 30.59mm | 37mm | 10.3mm |
| 8mm | 38mm | 30.59mm | 34mm | 12.7mm |
| 14mm | 33mm | 26.41mm | 37mm | 7.9mm |
| 8mm | 33mm | 26.41mm | 34mm | 10.6mm |
| 14mm | 28mm | 21.74mm | 37mm | 5.1mm |
| 8mm | 28mm | 21.74mm | 34mm | 8.2mm |
| 8mm | 24mm | 18.16mm | 34mm | 6.2mm |
| 6mm | 24mm | 18.16mm | 34mm | 7.1mm |

*FIG - 7*

SEAL PIN FLOW RATE METHOD AND SYSTEM

FIELD

The present disclosure relates to a method and system for actuating a seal pin of a container forming and filling system.

BACKGROUND

This section provides background information related to the present disclosure, which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Existing container forming and filling methods and systems are suitable for their intended use, but are subject to improvement. For example, existing container forming and filling methods and systems are unable to create an optimized flow rate of fluid through a filling nozzle for simultaneously forming and filling a polymeric container. As a result, existing container forming and filling systems are unable to maximize the efficiency and speed of the forming and filling process, limit fluid turbulence, limit cavitation, limit sheer, reduce fluid foaming, optimize energy consumption, and reduce torque and stress on a filling cylinder, servo, and other components of the system. The present teachings provide for methods and systems for simultaneously forming a container from a preform and filling the container with fluid that address these shortcomings in the art, as well as provide numerous advantages as recognized by one skilled in the art.

SUMMARY

This section provides a general summary of the disclosure, and is not a comprehensive disclosure of its full scope or all of its features.

The present teachings provide for a method for simultaneously forming a container from a preform, and filling the container with fluid while a finish of the container is connected to a nozzle of a forming and filling system. The method includes the following: determining an effective fill area at an opening of the finish through which the fluid can pass while a stretch rod of the forming and filling system is seated within the opening; actuating a seal pin of the forming and filling system to open a nozzle passage of the nozzle to allow the fluid to flow through the nozzle passage and through the opening of the finish to simultaneously form the container from the preform and fill the container; detecting a degree to which the nozzle passage is open; increasing fill velocity of the fluid to the nozzle as the nozzle passage is opened; setting fill velocity of the fluid to a maximum fill velocity when the nozzle passage is opened such that an area of the nozzle passage is at least equal to the effective fill area at the opening of the finish; and closing the seal pin to close the nozzle passage after the container is formed and filled.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 illustrates exemplary seal pin positions for full fluid flow according to the present teachings for various exemplary containers.

Corresponding reference numerals indicate corresponding parts throughout the several views of the drawings.

DETAILED DESCRIPTION

Example embodiments will now be described more fully with reference to the accompanying drawings.

Figure 1:
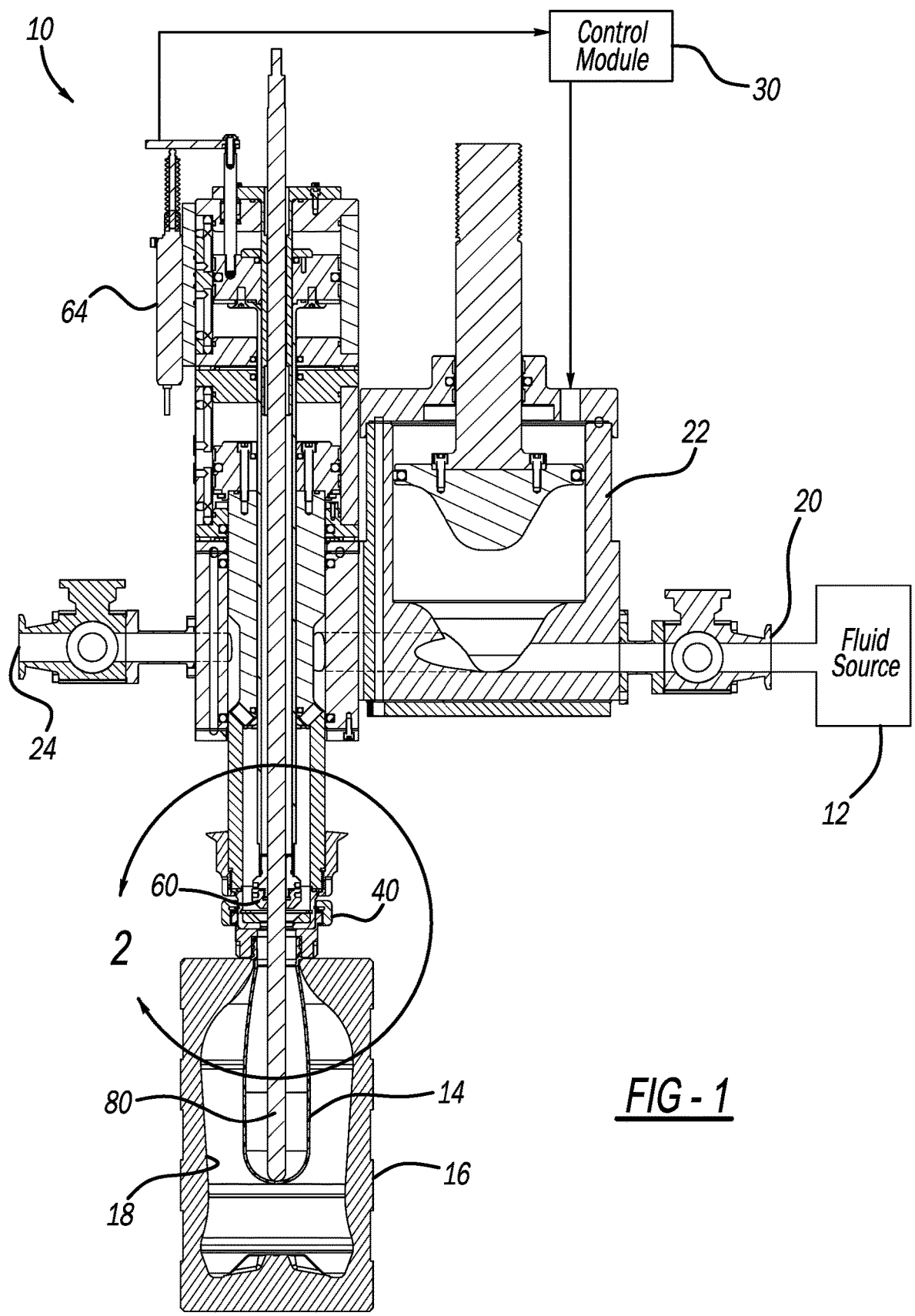
FIG. 1 is a cross-sectional view of a container forming and filling system in accordance with the present teachings.

FIG. 1 is a cross-sectional view of a container forming and filling system 10 in accordance with the present teachings. The system 10 can be connected to any suitable fluid source 12 for simultaneously forming and filling any suitable polymeric container from a preform 14. Any suitable fluid can be used. For example, water, juice, flavored dirnks, carbonated soda, detergents, oils, chemicals, and the like. The fluid expands the preform 14 within any suitable mold 16, which has an inner mold surface 18 defining any suitable container shape.

Specifically, fluid from the fluid source 12 passes through fluid inlet 20 into a fluid/filing cylinder 22. Excess fluid exits the system 10 through a fluid outlet 24. The fluid cylinder 22 controls the fill velocity at which fluid flows into the preform 14. The fluid cylinder 22 is controlled by a control module 30. In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the system 10, and the control module 30 thereof, described herein.

Figure 2:
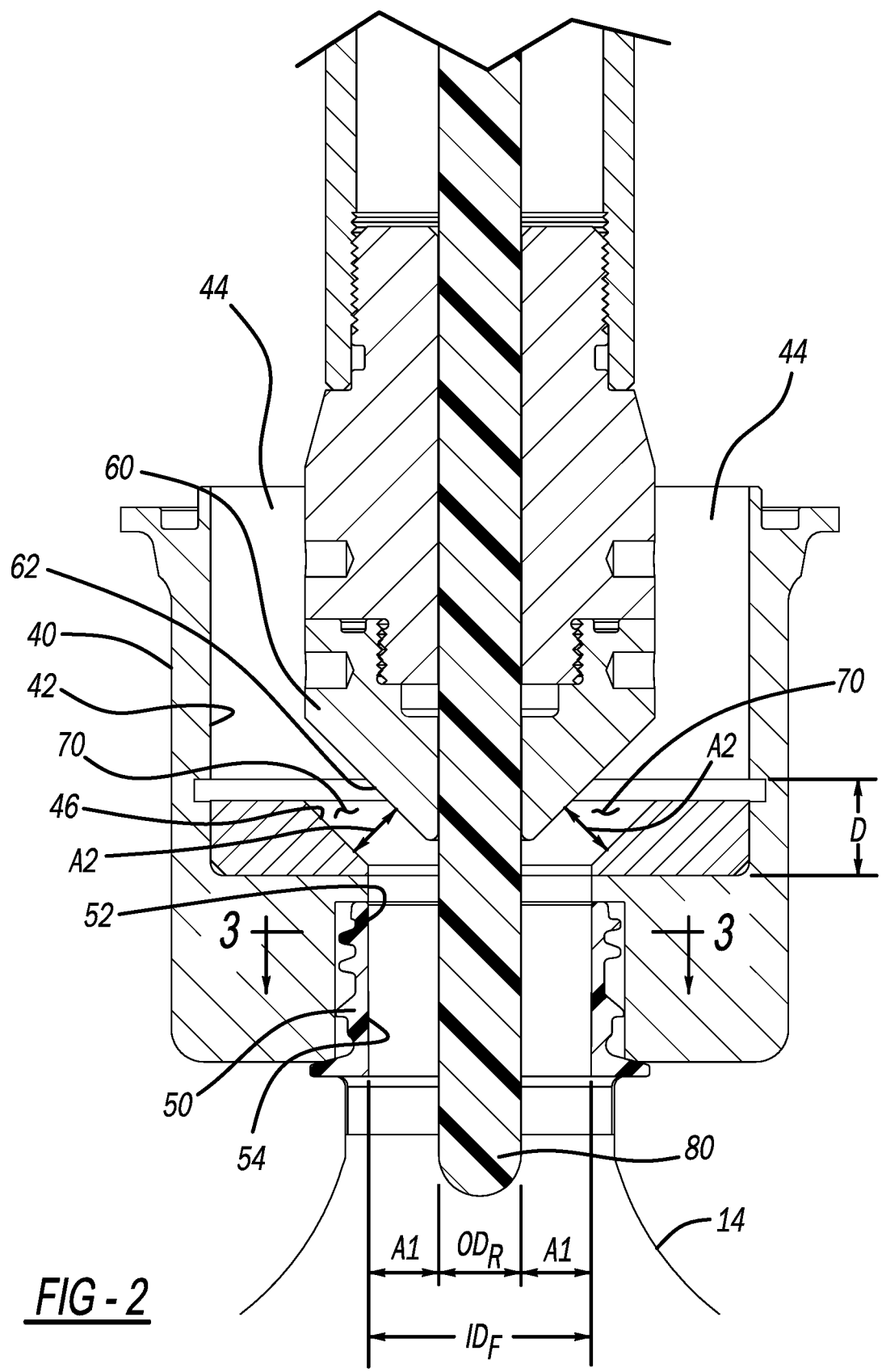
FIG. 2 illustrates area 2 of FIG. 1 as a close-up view.

With continued reference to FIG. 1, and additional reference to FIG. 2, the fluid cylinder 22 injects the fluid to a nozzle 40, and specifically to a fluid path 44 defined by a nozzle receptacle 42 of the nozzle 40. Connected to the nozzle 40 is a finish 50 of the preform 14 and the container formed therefrom. The finish 50 defines an opening 52 through which the fluid is injected.

Seated within the nozzle receptacle 42 is a seal pin 60. The seal pin 60 includes a sealing surface 62, which is arranged opposite to a nozzle sealing surface 46 of the nozzle 40. In a closed position, the seal pin 60 is arranged such that the sealing surface 62 abuts the nozzle sealing surface 46 in order to prevent fluid from flowing through the nozzle 40 and into the preform 14. From the closed position, the seal pin 60 is movable to an open position, such as illustrated in FIG. 2. When the seal pin 60 is open, the sealing surface 62 is spaced apart from the nozzle sealing surface 46 to define a nozzle passage 70 therebetween. Fluid flowing from the fluid cylinder 22 and through the fluid path 44 can thus flow through the nozzle passage 70 to the finish 50, and specifically through the opening 52 of the finish 50 in order to form and fill the container from the preform 14. The position of the seal pin 60, such as in a closed position or any degree of an open position, is detected with any suitable seal pin position detector or sensor 64 (see FIG. 1). Any suitable seal pin position detector 64 can be used, such as any suitable laser sensor or linear variable differential transducer (LVDT). The control module 30 receives inputs from the seal pin position detector or sensor 64 so that the control module 30 knows the position of the seal pin 60.

Figure 3:
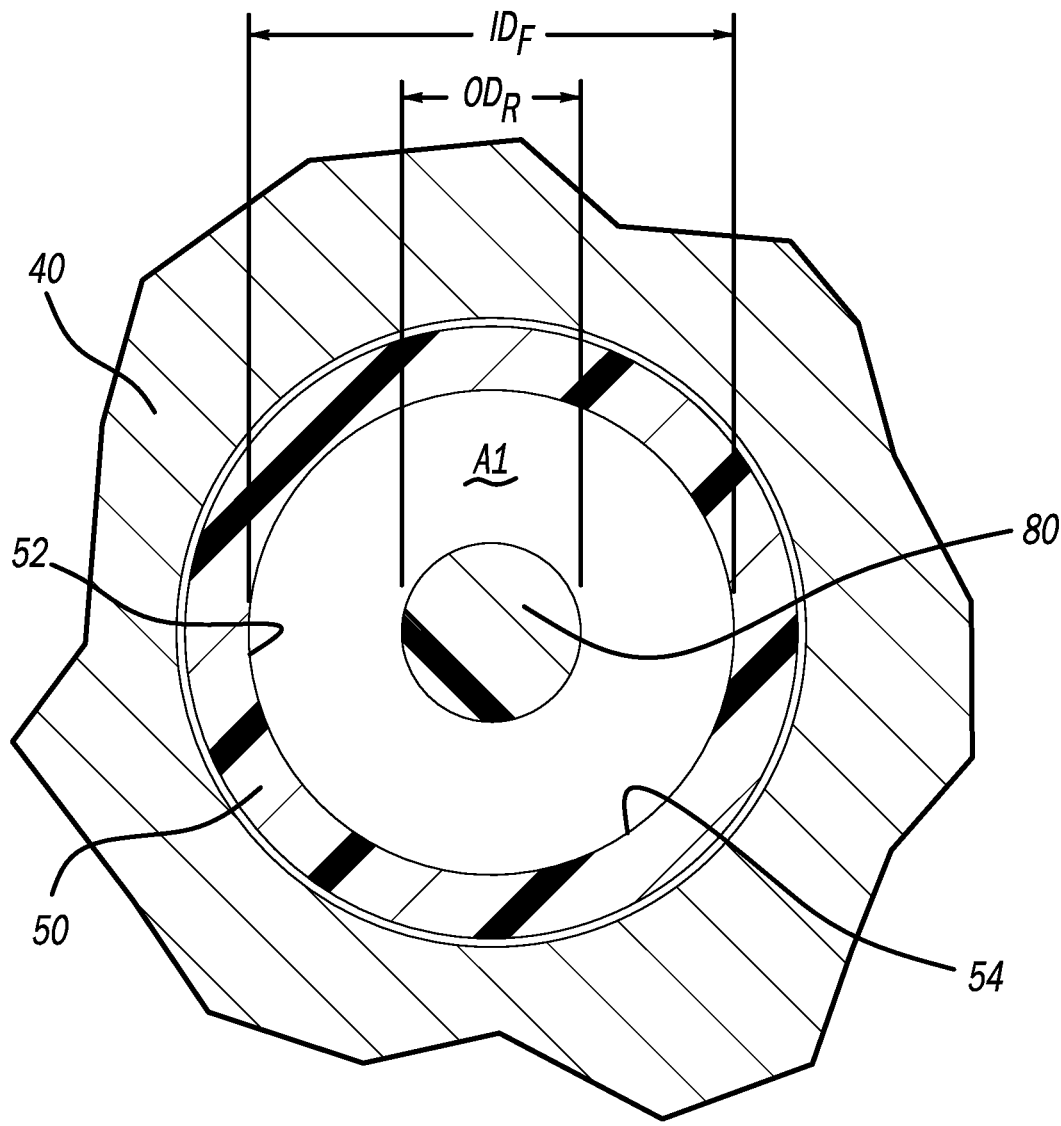
FIG. 3 is a cross-sectional view taken along line 3-3 of FIG. 2.

A stretch rod 80 is included to facilitate stretching of the preform 14 into the mold 16. The stretch rod 80 extends within and beyond the seal pin 60, and is movable independent of the seal pin 60. As fluid is injected into the preform 14, the stretch rod 80 is positioned so as to extend through the finish 50 to a bottom surface of the preform 14, such as is illustrated in FIG. 1. Thus the presence of the stretch rod 80 within the finish 50 reduces the area of the opening 52 through which fluid can flow into the preform 14, which is illustrated in FIGS. 2 and 3 as effective fill area A1. Effective fill area A1 can be calculated by the control module 30 in any suitable manner, or input to the control module 30. For example, the effective fill area A1 of the finish 50 at the opening 52 can be determined based on a difference between an inner diameter $ID_F$ of the finish 50 and an outer diameter $OD_R$ of the stretch rod 80. Thus the effective fill area A1 is the area around the stretch rod 80 between the stretch rod 80 and an inner sidewall 54 of the finish 50 through which fluid can pass through the finish 50.

Figure 4:
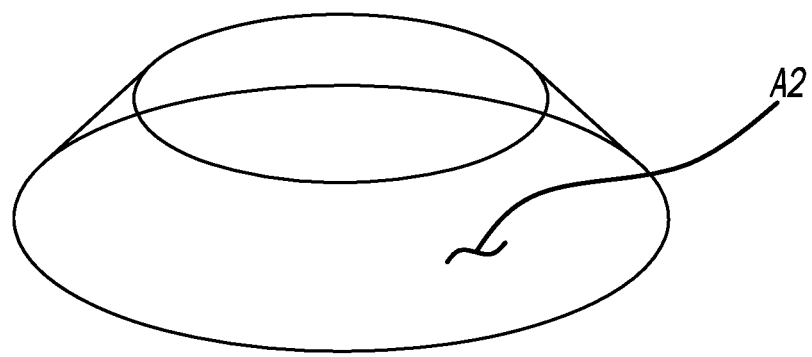
FIG. 4 illustrates a nozzle passage area of the container forming and filling system of FIG. 1.

As explained herein, flow of fluid through the effective fill area A1 is optimized when the seal pin 60 is opened to a degree such that an area A2 of the nozzle passage 70, which extends in a generally circular manner along the generally circular sealing surface 62 and the nozzle sealing surface 46, is equal to or greater than the effective fill area A1. FIG. 4 illustrates the general shape of area A2.

Figure 5:
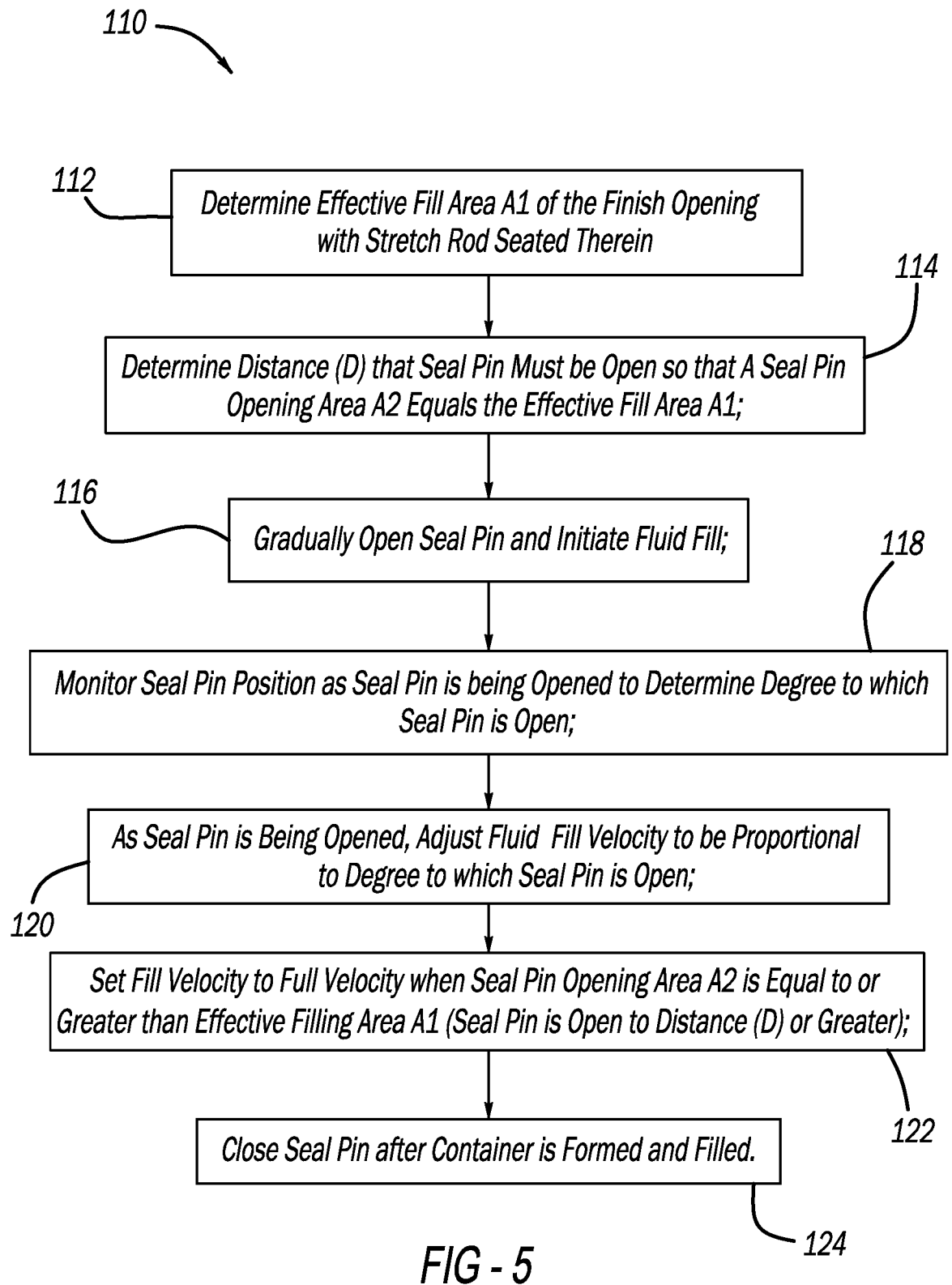
FIG. 5 illustrates a method for simultaneously forming a container from a preform and filling the container with fluid in accordance with the present teachings.

FIG. 5 illustrates a method 110 for simultaneously forming a container from a preform and filling the container with fluid. Although the method 110 is described herein in conjunction with the system 10, the method 110 can be used with any other suitable filling system 10 as well. With initial reference to block 112, the effective fill area A1 of the opening 52 of the finish 50 with the stretch rod 80 seated within the opening 52 is determined in any suitable manner. For example, the effective fill area A1 can be determined by subtracting the outer diameter $OD_R$ of the stretch rod 80 from the inner diameter $ID_F$ of the finish 50. The effective fill area A1 can be calculated directly by the control module 30, or input to the control module 30.

At block 114, the distance D that the seal pin 60 must be open so that the seal pin opening area A2 equals the effective fill area A1 is determined. Various exemplary distances D are set forth in FIG. 7, and are expressed as Seal Pin Positions for Full Flow. Thus for the example in which the stretch rod 80 has a diameter of 14 mm, the finish 50 has an overall diameter of 28 mm, the inner diameter $ID_F$ of the finish 50 is 21.74 mm, and the seal pin 60 has a diameter of 37 mm, an exemplary distance D is 5.1 mm. The distance D can be determined in any suitable manner, such as by the control module 30 based on inputs from the seal pin position detector 64. Specifically, the control module 30 notes the distance D that the seal pin 60 has moved from a closed position to an open position in which the seal pin opening area A2 equals the effective fill area A1. The area A1 can be determined as set forth above, and the seal pin opening area A2 can be determined by analyzing the geometry of the seal pin 60 and sealing surface 46, calculating the amount of opening required for the nozzle passage 70 to equal to A1, and converting the opening into a linear distance that can be detected by the sensor 64.

At block 116, the control module 30 gradually opens the seal pin 60, and initiates fluid fill by the fluid cylinder 22. At block 118, the control module 30 monitors the position of the seal pin 60, such as with the seal pin position detector 64, as the seal pin 60 is opened to determine the degree (or distance) to which the seal pin 60 has opened. At block 120, as the seal pin 60 is opened, the control module 30 adjusts the fluid cylinder 22 in order to adjust the fluid fill velocity to be proportional to the degree (or distance) to which the seal pin 60 has been opened. At block 122, the control module 30 sets the fill velocity of the fluid cylinder 22 to full velocity when the seal pin opening area A2 equals the effective filling area A1 of the opening 52 of the finish 50, which occurs when the seal pin 60 is opened to distance D. After the container is formed and filled with fluid, the seal pin 60 is closed so that sealing surface 62 contacts nozzle sealing surface 46 and nozzle passage 70 is closed. The formed and filled container is removed from cooperation with the nozzle 40, and a new preform is connected to the nozzle 40 for forming and filling.

Figure 6:
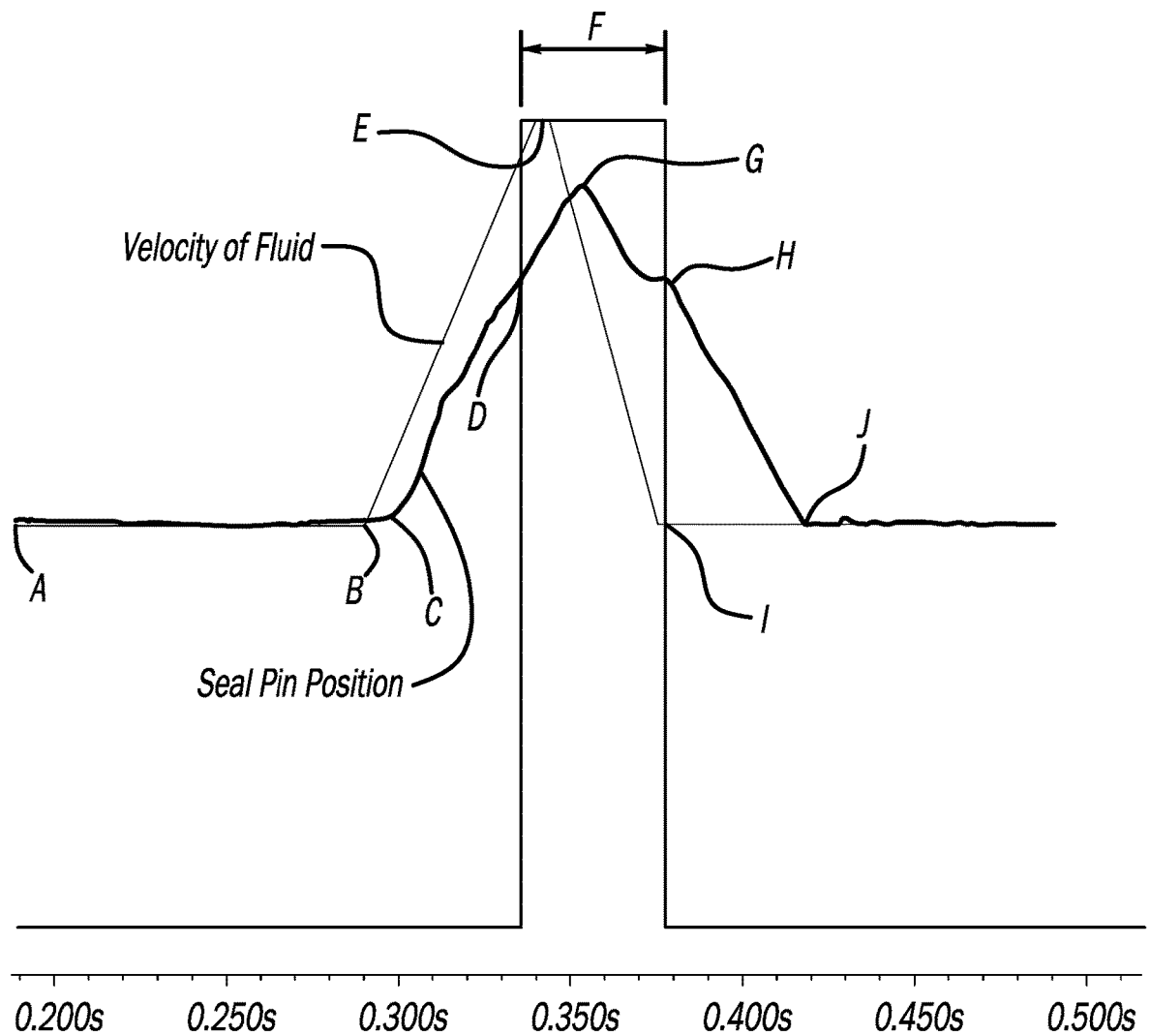
FIG. 6 illustrates a plot file in accordance with the present teachings.

FIG. 6 illustrates an exemplary plot file 210 of the control module 30, or any other suitable control device, for control of the system 10. The plot file 210 illustrates position of the seal pin 60 with respect to the velocity of fluid to the nozzle 40, generated by the fluid cylinder 22, for example. At reference letter A, the velocity of the fluid is zero, or about zero, and the seal pin 60 is closed such that the sealing surface 62 abuts the nozzle sealing surface 46 in order to close the nozzle passage 70. At reference letter B, the control module 30 activates the fluid cylinder 22 to initiate fluid flow to the nozzle 40. Subsequently, the control module 30 begins to open the seal pin 60 at reference letter C. The velocity of the fluid is increased and the seal pin 60 is opened further, and at reference letter D the seal pin opening area A2 equals the effective fill area A1. After area A2 equals area A1, the control module 30 brings the velocity of the fluid flow to a maximum fill velocity at reference letter E. During time period F, the seal pin opening area A2 can be greater than the effective fill area A1 as illustrated, and at reference letter G the seal pin opening area A2 can be open to its greatest extent. Alternatively, area A2 can equal area A1 for the duration of time period F. At reference letter H, the seal pin 60 is positioned so that area A2 again equals A1, and at generally the same point in time, the control module 30 commands the fluid cylinder 22 to reduce the fluid velocity to zero. Subsequently, at reference letter J the control module 30 closes the seal pin 60.

The present teachings realize numerous advantages by controlling the fluid flow rate through the nozzle 40 so that the fluid is injected at a velocity that can be accommodated by the seal pin opening area A2, and ramping up fluid flow so that the fluid reaches full velocity only when the seal pin opening area A2 is equal to, or greater than, the effective fill area A1 of the finish 50 with the stretch rod 80 seated therein. For example, the present teachings maximize forming and filling efficiency and speed, limit turbulence, cavitation, and sheer of the fluid, reduce foaming, optimize energy consumption, and reduce torque and stress on the fluid cylinder 22 and other components of the system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for simultaneously forming and filling a container from a preform with fluid while a finish of the container is connected to a nozzle of a forming and filling system, the method comprising:
    determining an effective fill area at an opening of the finish through which the fluid can pass while a stretch rod of the forming and filling system is seated within the opening;
    actuating a seal pin of the forming and filling system to open a nozzle passage of the nozzle to allow the fluid to flow through the nozzle passage and through the opening of the finish to simultaneously form the container from the preform and fill the container;
    detecting a degree to which the nozzle passage is open;
    increasing fill velocity of the fluid to the nozzle as the nozzle passage is opened;
    setting fill velocity of the fluid to a maximum fill velocity when the nozzle passage is opened such that an area of the nozzle passage is at least equal to the effective fill area at the opening of the finish;
    setting the fill velocity of the fluid to the maximum fill velocity after the seal pin has been actuated to make the area of the nozzle passage equal to the effective fill area at the opening of the finish; and
    closing the seal pin to close the nozzle passage after the container is formed and filled.

2. The method of claim 1, wherein determining the effective fill area at the opening of the finish includes:
    determining a difference between an inside diameter of the finish and an outside diameter of the stretch rod, the difference equal to the effective fill area.

3. The method of claim 1, wherein the degree to which the nozzle passage is open is detected by determining how far the seal pin has moved from a closed position to an open position.

4. The method of claim 3, further comprising determining a distance that the seal pin has moved from the closed position to the open position when in the open position an area of the nozzle passage is equal to the effective fill area.

5. The method of claim 4, further comprising measuring the distance that the seal pin has moved with a laser sensor or a linear variable differential transducer.

6. The method of claim 1, further comprising initiating fluid flow to the nozzle before opening the nozzle passage.

7. The method of claim 1, further comprising further actuating the seal pin to make the area of the nozzle passage greater than the effective fill area at the opening of the finish after setting the fill velocity of the fluid to the maximum fill velocity.

8. The method of claim 1, further comprising maintaining the seal pin in an open position such that the area of the nozzle passage is at least equal to the effective fill area at the opening of the finish after the fill velocity of the fluid has been reduced from the maximum fill velocity.

9. The method of claim 1, further comprising closing the seal pin to close the nozzle passage after reducing the fill velocity to zero.

10. A method for simultaneously forming and filling a container from a preform with fluid while a finish of the container is connected to a nozzle of a forming and filling system, the method comprising:

determining an effective fill area at an opening of the finish through which the fluid can pass while a stretch rod of the forming and filling system is seated within the opening;

actuating a seal pin of the forming and filling system to open a nozzle passage of the nozzle to allow the fluid to flow through the nozzle passage and through the opening of the finish to simultaneously form the container from the preform and fill the container;

detecting a degree to which the nozzle passage is open;

increasing fill velocity of the fluid to the nozzle as the nozzle passage is opened;

setting fill velocity of the fluid to a maximum fill velocity when the nozzle passage is opened such that an area of the nozzle passage is at least equal to the effective fill area at the opening of the finish; and closing the seal pin to close the nozzle passage after the container is formed and filled;

wherein the degree to which the nozzle passage is open is detected by determining how far the seal pin has moved from a closed position to an open position; and wherein the method further includes determining a distance that the seal pin has moved from the closed position to the open position when in the open position an area of the nozzle passage is equal to the effective fill area.

11. The method of claim 10, wherein the method further includes measuring the distance that the seal pin has moved with a laser sensor or a linear variable differential transducer.

* * * * *